No. 668,761. Patented Feb. 26, 1901.
N. H. SUREN.
APPARATUS FOR CONNECTING STORAGE BATTERIES WITH CHARGING LINES.
(Application filed June 29, 1899.)
(No Model.)
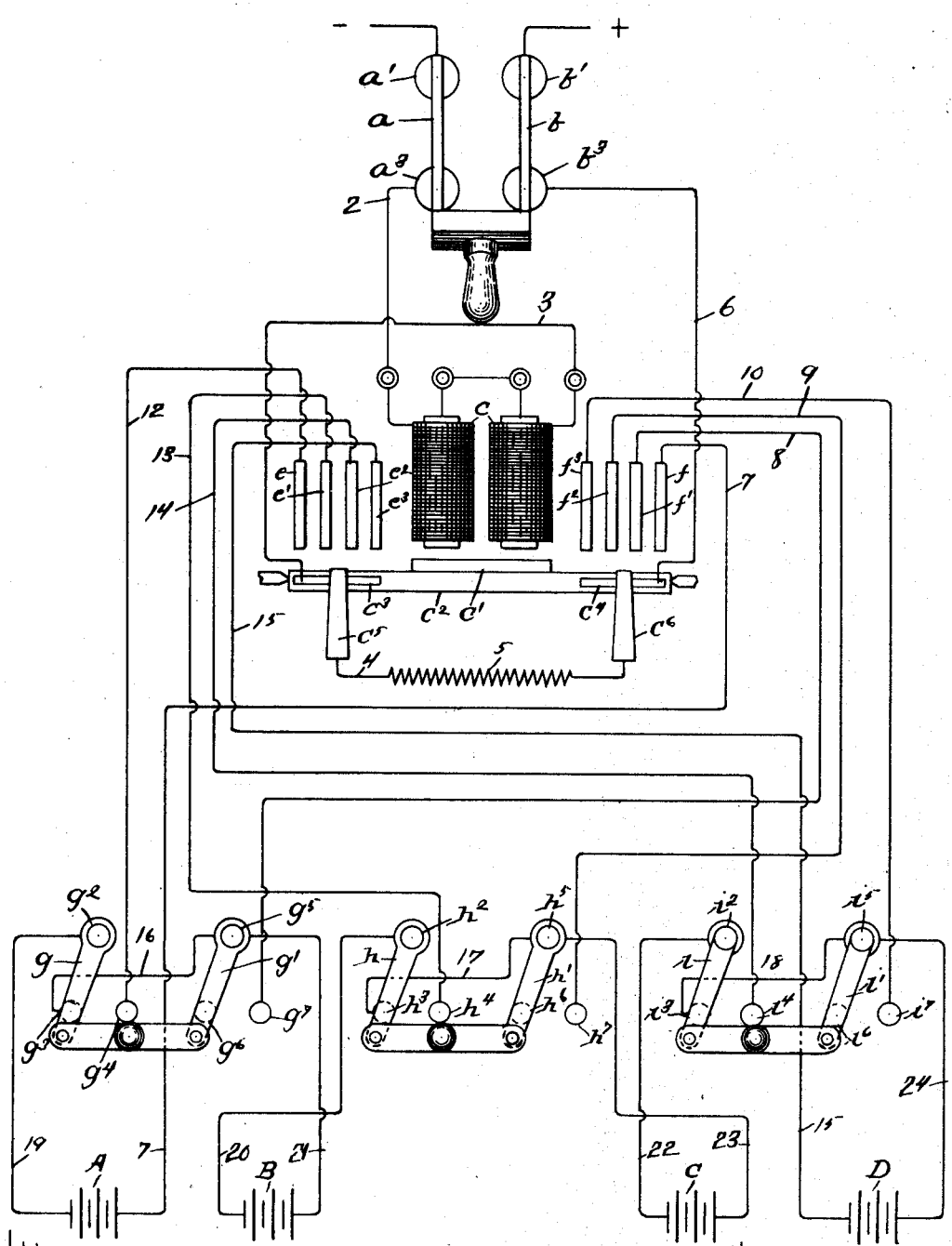

UNITED STATES PATENT OFFICE.

NATHAN H. SUREN, OF NEEDHAM, MASSACHUSETTS.

APPARATUS FOR CONNECTING STORAGE BATTERIES WITH CHARGING-LINES.

SPECIFICATION forming part of Letters Patent No. 668,761, dated February 26, 1901.

Application filed June 29, 1899. Serial No. 722,287. (No model.)

*To all whom it may concern:*

Be it known that I, NATHAN H. SUREN, of Needham, county of Norfolk, and State of Massachusetts, have invented an Improvement in Apparatus for Connecting Storage Batteries with a Charging-Line, of which the following description, in connection with the accompanying drawing, is a specification, like characters on the drawing representing like parts.

At the present time it is customary in many places to use storage batteries for fire-alarm and police signal systems, and such storage batteries are charged at the proper time by a current from a suitable charging-line. It is also customary to purchase the charging-current, which is measured as it is delivered, and consequently it is important to economize the charging-current to the utmost.

This invention has for its object to provide means whereby the storage batteries may be connected with the charging-circuit in different ways in order to match the electric motive force of the batteries to the electric motive force of the charging-current, which results in ecomizing the amount of current used in charging the storage batteries.

The invention consists in a charging-circuit, a number of storage batteries, and a number of switches for connecting the terminals of the storage batteries with said charging-circuit, said switches being constructed and arranged to be operated to connect said storage batteries in several different ways with the charging-circuit—as, for instance, they may be connected in series or in multiple series or in parallel with said charging-circuit; and the invention also consists in a charging-circuit, a number of storage batteries, and means for connecting them all simultaneously with said charging-circuit, and a number of switches for changing the electric connections of said storage batteries with said charging-circuit independent of the means employed for connecting them therewith, whereby they may be connected in series or multiple series or in parallel, as desired, and thereafter changed at will.

The drawing shows in diagram a portion of a charging-circuit, a number of storage batteries, and means embodying this invention for connecting said storage batteries with the charging-circuit in series, or in multiple series, or in parallel, according to the will of the operator.

$a$ $b$ represent a pair of switch-arms of an ordinary double-pole knife-switch, which are pivoted to posts $a'$ $b'$ and which are connected together by an insulating bridge or cross piece having attached to it a handpiece, by means of which the knife-switch is operated. $a^3$ $b^3$ represent a pair of posts having split ends which are engaged by said switch-arms when the switch is closed.

$c$ represents an electromagnet the coils of which are adapted to be included in the charging-circuit when the knife-switch is closed, and the armature $c'$ of said electromagnet is secured to a pivoted plate $c^2$, to the front edge of which is secured two metallic strips $c^3$ $c^4$. When the armature $c'$ is retracted, as represented in the drawing, the metallic strips $c^3$ $c^4$ will engage contact-springs $c^5$ $c^6$, which are connected together by a wire 4, which may and preferably will include a suitable resistance 5. The wire 4, connected to the terminal springs $c^5$ $c^6$, constitutes a loop-circuit.

A wire 2 connects the post $a^3$ with the coils of the electromagnet $c$, and a wire 3 leads from the coils of said electromagnet to the metallic strip $c^3$, and said strip being in engagement with the contact-spring $c^5$ the circuit will continue by loop-circuit 4 to contact-spring $c^6$, and said contact-spring $c^6$ being in engagement with the metallic strip $c^4$ the circuit will continue by wire 6, which is connected to the post $b^3$. Thus it will be seen that when the knife-switch is closed the electromagnet $c$ will be connected with the charging-circuit and will be energized; but as its armature is at once attracted the metallic strips $c^3$ $c^4$ will disengage the contact-springs $c^5$ $c^6$.

A number of contact-springs are provided which are adapted to be engaged by the metallic strips $c^3$ $c^4$ when the armature is in its attracted position, said contact-springs representing the storage-battery terminals, and herein four storage batteries are shown, and consequently there will be eight battery-terminals, and for simplicity they are disposed in two groups, four in each group, at each side of the electromagnet $c$, and one of the groups of battery-terminals, as $e$ $e'$ $e^2$ $e^3$, will be so disposed relative to each other that all of them will be engaged by the metallic strip $c^3$ when the armature is attracted, and the other group of battery-terminals, as $f\ f'\ f^2 f^3$, will be so disposed relative to each other that all of them will be engaged by the metallic strip $c^4$ when the armature is attracted.

A B C D represent four storage batteries which are connected by circuit-wires with the said battery-terminals, and suitable switches are provided for connecting them with said battery-terminals in different ways, so that when the armature is attracted all of the battery-terminals will be simultaneously connected with the charging-circuit. The batteries thus connected may be arranged in series, or in multiple series, or in parallel with the charging-circuit, as desired.

To determine or control the arrangement of the batteries with the charging-circuit three compound or two-armed switches will be provided, each consisting of a pair of pivoted arms connected together by an insulating cross-piece having a knob or handpiece by which the switch may be operated. The three switches may thus be operated independently of each other and also independent of the means employed for connecting all the storage batteries with the charging-circuit.

$g\ g'$ represent the two arms of one of the switches. $h\ h'$ represent the two arms of another switch, and $i\ i'$ represent the two arms of the third switch. The arm $g$ is pivoted at $g^2$ and engages one or the other contact $g^3$ or $g^4$. The arm $g'$ is pivoted at $g^5$ and engages one or the other contact $g^6$ or $g^7$. The arm $h$ is pivoted at $h^2$ and engages one or the other contact $h^3$ or $h^4$. The arm $h'$ is pivoted at $h^5$ and engages one or the other contact $h^6$ or $h^7$. The arm $i$ is pivoted at $i^2$ and engages one or the other contact $i^3$ or $i^4$. The arm $i'$ is pivoted at $i^5$ and engages one or the other contact $i^6$ or $i^7$.

The battery-terminal $f$ is connected with one side of the battery A by wire 7, the battery-terminal $f'$ is connected by wire 8 with the contact $g^7$, the battery-terminal $f^2$ is connected by wire 9 with the contact $h^7$, and the battery-terminal $f^3$ is connected by wire 10 with the contact $i^7$. The battery-terminal $e$ is connected by wire 12 with the contact $g^5$, the battery-terminal $e'$ is connected by wire 13 with the contact $h^4$, the battery-terminal $e^2$ is connected by wire 14 with the contact $i^4$, and the battery-terminal $e^3$ is connected by wire 15 with one side of the storage battery D. A wire 16 connects the contact $g^3$ with the contact $g^5$, a wire 17 connects the contact $h^3$ with the contact $h^5$, a wire 18 connects the contact $i^3$ with the contact $i^5$, and a wire 19 connects the other side of the battery A with the pivot-post $g^2$. The wire 20 connects one side of the battery B with the pivot-post $h^2$, and wire 21 connects the other side of said battery B with the pivot-post $g^5$. A wire 22 connects one side of the battery C with the pivot-post $i$, and the wire 23 connects the other side of said battery C with the pivot-post $h^5$, and a wire 24 connects the other side of the battery D with the pivot-post $i^5$.

When all of the switches are thrown to the left, as represented in the drawing, the four batteries will be arranged in series and the circuit can be traced as follows: charging-wire, switch-arm $a$, post $a^3$, wire 2, electromagnet $c$, wire 3, metallic strip $c^3$, and battery-terminals $e$ to $e^3$, all of which are connected with an open wire except $e^3$, (when the switches are in the position referred to,) and from $e^3$ the circuit continues by wire 15, battery D, wire 24, pivot-post $i^5$, wire 18, contact-pin $i^3$, arm $i$, pivot-post $o^2$, wire 22, battery C, wire 23, post $h^5$, wire 17, arm $h$, pivot-post $h^2$, wire 20, battery B, wire 26, post $g^5$, wire 16, arm $g$, post $g^2$, wire 19, battery A, wire 7, battery-terminal $f$, metallic strip $c^4$, wire 6, post $b^3$, arm $b^2$, and the other charging-wire. Thus it will be seen that all of the batteries are connected in series with the charging-circuit. If, however, all of the switches should be thrown to the right, then all of said batteries will be connected in parallel with the charging-circuit, and in such event all of the battery-terminals will be utilized. Furthermore, if any one of said switches should be thrown to the right, the battery controlled by said switch will be connected in series with the battery next to it, and so on. Thus it will be understood that several different arrangements of the batteries may be made, according to the requirements of the case.

While I have herein shown four storage batteries and three pairs of switches, I desire it to be understood that any other number of storage batteries may be employed and the number of switches will necessarily in all instances be one pair less than the number of storage batteries employed.

Referring to the connection of the battery-terminals it will be observed in tracing the circuits that it is always in accordance with a certain method, which may be stated as follows: The positive terminal of the first battery A is always directly or immediately connected to its corresponding contact-springs $f$ and the negative terminal of the last battery D is directly connected to its corresponding contact-spring $e$. The negative terminal of the battery A is connected to the pivot-post of the first switch-arm and the positive terminal of the following battery is connected to the pivot-post of its mate, and so on until all the switches and battery-terminals are connected. The contact $g^3$ is always connected to the pivot-post $g^5$ of its mate, and so on with all of the other switches. The contact $g^4$ of the first pair of switches is connected directly to the contact-spring $e$, which is the negative contact, and so on with all of the other switches. The contact $g^7$ of the first pair of switches is connected directly to the second contact-spring $f'$, and so on with all of the other switches.

I claim—

1. A number of storage batteries, a charging-circuit, and means for connecting said batteries with said charging-circuit consisting of a terminal connected by a wire with one pole of one of the batteries, another terminal connected by a wire with the opposite pole of another battery, switch-arms respectively connected by wires with the other poles of said batteries and with the poles of the other batteries and arranged in pairs, contacts for said switch-arms, a wire connecting one of the switch-arms of each pair with one of the contacts of the other switch-arm of said pair, a wire leading from one of the contacts of each switch-arm to a corresponding number of terminals, and a switch for connecting all of said terminals with the charging-circuit, substantially as described.

2. A number of storage batteries, a charging-circuit, and means for connecting said batteries with said charging-circuit consisting of a terminal connected by a wire with one pole of one of the batteries, another terminal connected by a wire with the opposite pole of another battery, switch-arms respectively connected by wires with the other poles of said batteries and with the poles of the other batteries and arranged in pairs, contacts for said switch-arms, a wire connecting one of the switch-arms of each pair with one of the contacts of the other switch-arm of said pair, a wire leading from one of the contacts of each switch-arm to a corresponding number of terminals, means for operating each pair of switch-arms independently, and a switch for connecting all of said terminals with the charging-circuit, substantially as described.

In testimony whereof I have signed my name to this specification in the presence of two subscribing witnesses.

NATHAN H. SUREN.

Witnesses:
B. J. NOYES,
JENNIE L. HUTCHINSON.